R. W. SELLEW.
BALL BEARING.
APPLICATION FILED MAY 22, 1920.

1,375,019.  Patented Apr. 19, 1921.

Inventor
R. W. Sellew
By his Attorneys
Mitchell & Allyn

UNITED STATES PATENT OFFICE.

ROLAND W. SELLEW, OF NEW BRITAIN, CONNECTICUT, ASSIGNOR TO THE FAFNIR BEARING COMPANY, OF NEW BRITAIN, CONNECTICUT, A CORPORATION OF CONNECTICUT.

BALL-BEARING.

1,375,019.

Specification of Letters Patent. Patented Apr. 19, 1921.

Application filed May 22, 1920. Serial No. 383,523.

*To all whom it may concern:*

Be it known that I, ROLAND W. SELLEW, a citizen of the United States of America, residing at New Britain, Connecticut, have invented a new and useful Ball-Bearing, of which the following is a specification.

My invention relates to so-called unitary ball bearings, and the same is especially useful as applied to duplex, or double row ball bearings, in which it is desirable to have the load on the respective rows of balls carried in opposite oblique directions whereby the finished bearing will successfully withstand both radial and thrust loads. Heretofore many means have been devised to facilitate the assembly of such bearings and ordinarily one of the bearing rings has been made of two separate pieces mechanically connected. These methods have not proved entirely satisfactory. By my improvement each of the two bearing rings, the inner one and the outer one, is a solid or integral member in the finished state. I accomplish this result by unique welding processes effected in such a way as to avoid distortion or displacement of the bearing rings. I likewise avoid undue cramping or binding of the race-ways on the balls.

Figure 1:
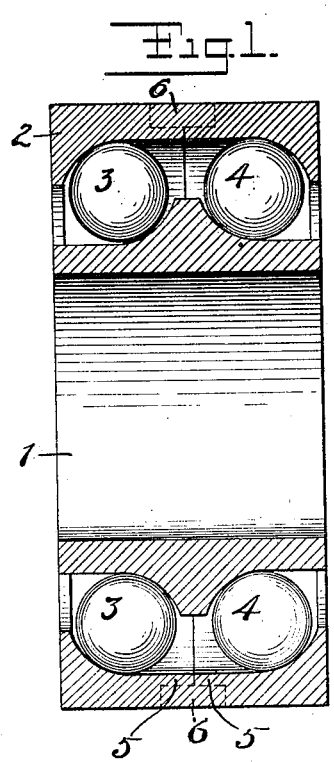
Figure 1 is a sectional view of a bearing constructed to embody my invention and made by one process.

In the bearing produced by the method illustrated in Fig. 1, 1 represents the inner bearing ring upon the outer surface of which are two spaced ball race-ways separated by a circumferential rib. 2 represents the outer bearing ring having on its inner surface two spaced ball race-ways complementary to the two race-ways on the inner bearing ring but preferably of a different spacing.

Figure 4:
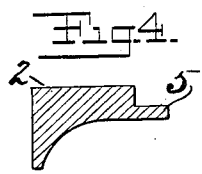
Figs. 4 and 5 are fragmentary detail views.

Between these race-ways are two rows of balls 3—4. In the present instance, I have shown no spacer device for the balls but as such devices are well understood, one may be provided if desired. The outer bearing ring 2 is made of two separately formed ring pieces of a cross section, for example, such as shown in Fig. 4. Each of said ring pieces is provided with a spacer flange 5 adjacent to its inner circumference so as to leave a recess outside of said spacer flange. These two separate rings are so designed and proportioned that when the same are brought together the two spacers will abut and hold the race-ways on the balls with the desired degree of contact pressure. 6 is a ring-like fillet piece of metal preferably corresponding substantially to the metal from which the two ring sections are made, although it may be of any metal which can be electrically welded therewith so as to produce a satisfactory union. When the two rows of balls have been assembled on the inner ring and the two outer ring sections have been applied thereto, the same are held firmly in the final position by any suitable form of holder. An electric welding operation is then performed on that part of the two ring sections where the ring-like fillet piece 6 is located so that the said fillet piece and the ring sections will be integrally united.

In Fig. 1, I have shown by dotted lines an outline of the fillet ring section 6, inasmuch as there is no definite line of demarcation after the welding operation is completed.

Figure 2:
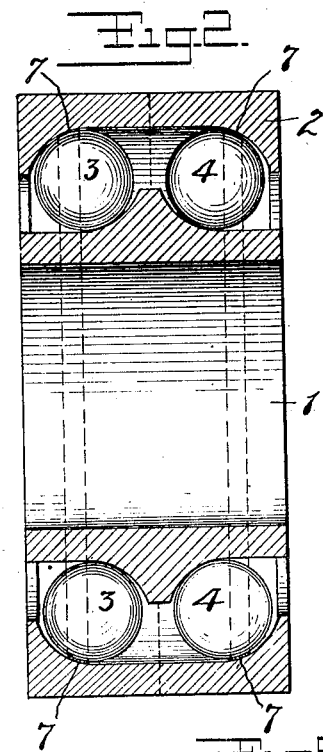
Fig. 2 is a similar view of the bearing made by another process.
Figure 3:
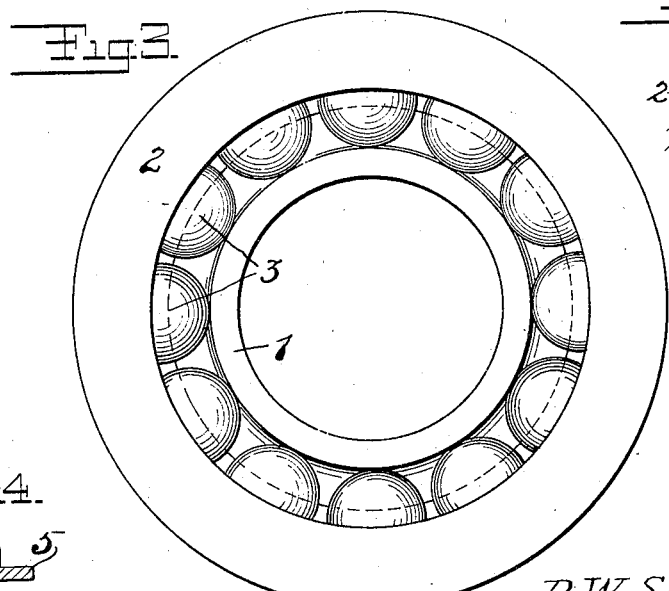
Fig. 3 is a side elevation of the complete bearing made by either of the aforesaid processes.
Figure 5:
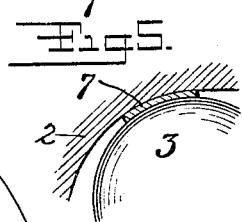

In Fig. 2 I have produced the bearing by a different process, wherein the two ring sections are welded together without the use of spacer flanges and a separate fillet piece. In the practice of electric welding, it is necessary to hold together firmly the two things to be united, and hence it is necessary to guard against pressing the two ring sections together so tightly as to unduly bind upon the balls. Accordingly, in assembling the parts I introduce one or more thin destructible shims between one or more of the ball race-ways or tracks and the balls adjacent thereto. Two of these shims are indicated at 7, Fig. 2, and are exaggerated in Fig. 5. Obviously, when the two ring sections of the outer bearing ring are forced hard together the adjacent destructible shim will act as an adequate spacer so that, as the adjacent edges of the outer ring sections are being welded together, the said ring sections will not be forced together more tightly so as to bind on the balls. After the welding operation has been completed the destructible shim or shims may be cut out or otherwise removed and this will afford the desired degree of freedom between the bearing rings and the balls so that the same will turn evenly and easily. Any suitable material may be employed for the same, only care should be observed that the shim is of uniform thickness throughout so that the finished bearing will be no tighter on one side than on the other. It will be observed that the balls so engage the rings and vice versa, that rings and balls alike are not only held in an assembled state but also in an adjusted relation, the latter being a feature typical of unitary ball bearings.

While the processes of manufacture constitute no part of this invention as claimed herein, I nevertheless deem it desirable to describe the processes of manufacture as well as the bearing itself so that anyone skilled in the art may understand how such a bearing can be successfully produced. Any roughness or unevenness where the welding occurs may be ground away and if desired a proper provision may be made in the two ring sections whereby a portion of the surface may be ground off after the welding is completed.

What I claim is:

1. A ball bearing of the type described, comprising an inner and an outer bearing ring having complementary race tracks therein with balls in said race tracks operating to hold said rings in adjusted and operative position, one of said bearing rings being formed of two annular ring sections each section having a ball bearing surface forming one of said tracks, and a welded connection between said sections to permanently unite the same.

2. A double row ball bearing of the type described, comprising an inner and an outer bearing ring having two sets of complementary ball race tracks therein, two rows of balls in said race tracks operating to hold said rings in adjusted and operative position, one of said rings being formed of two ring sections each section having one of said race tracks thereon, and a welded connection between said sections to permanently unite the same.

3. A double row ball bearing of the type described, comprising an inner and an outer bearing ring having two sets of complementary race tracks therein, two rows of balls in said race tracks operating to hold said rings in adjusted and operative position, one of said rings being formed of two ring-like sections each section having one of said tracks thereon, and a welded connection between said sections to permanently unite the same, the complementary race tracks being oblique to each other.

4. A ball bearing of the type described, comprising an inner and an outer bearing ring with complementary ball race tracks therein, balls in said race tracks operating to hold said bearing rings in assembled and operative position, one of said rings comprising two abutting annular ring sections and a third ring section adjacent the abutting portions of the first two sections, and a welded connection between all of said sections to permanently unite the same.

5. A ball bearing of the type described, comprising an inner and an outer bearing ring having complementary race tracks therein with balls in said race tracks operating to hold said rings in assembled and operative position, one of said bearing rings being formed of two annular ring sections, each of said sections having a ball bearing surface thereon forming one of said race tracks, and a welded connection at the adjacent edges of said two ring sections operating to permanently unite said sections.

6. A ball bearing of the type described, comprising an inner and an outer bearing ring having complementary race tracks therein, balls in said race tracks operating to hold said bearing rings in adjusted and operative position, the outer bearing ring being formed of two annular ring sections each section having a ball bearing surface thereon forming one of said race tracks, and a welded connection operating to permanently unite said two sections.

ROLAND W. SELLEW.